(12) United States Patent
Vervisch-Picois et al.

(10) Patent No.: US 10,761,181 B2
(45) Date of Patent: Sep. 1, 2020

(54) METHOD FOR LOCATING A RECEIVER WITHIN A POSITIONING SYSTEM

(71) Applicant: INSTITUT MINES-TELECOM, Paris (FR)

(72) Inventors: Alexandre Vervisch-Picois, Tours (FR); Nel Samama, Saint-maur des Fossés (FR)

(73) Assignee: INSTITUT MINES-TELECOM, Paris (FR)

( * ) Notice: Subject to any disclaimer, the term of this patent is extended or adjusted under 35 U.S.C. 154(b) by 302 days.

(21) Appl. No.: 15/735,734

(22) PCT Filed: Jun. 21, 2016

(86) PCT No.: PCT/EP2016/064323
§ 371 (c)(1),
(2) Date: Dec. 12, 2017

(87) PCT Pub. No.: WO2016/207169
PCT Pub. Date: Dec. 29, 2016

(65) Prior Publication Data
US 2018/0164402 A1 Jun. 14, 2018

(30) Foreign Application Priority Data
Jun. 24, 2015 (FR) ..................... 15 55810

(51) Int. Cl.
*G01S 5/10* (2006.01)
*G01S 1/04* (2006.01)
*G01S 1/20* (2006.01)

(52) U.S. Cl.
CPC ............ *G01S 5/10* (2013.01); *G01S 1/042* (2013.01); *G01S 1/20* (2013.01)

(58) Field of Classification Search
CPC combination set(s) only.
See application file for complete search history.

(56) References Cited

U.S. PATENT DOCUMENTS 3,774,209 A    11/1973  Fleming et al.
6,266,014 B1    7/2001  Fattouche et al.
(Continued)

FOREIGN PATENT DOCUMENTS

EP    1724602 A1    11/2006
WO    2013137790 A1    12/2010

OTHER PUBLICATIONS

Corresponding International application, application No. PCT/EP2016/064323, International Search Report dated Sep. 5, 2016, 6 pages.

*Primary Examiner* — Mamadou L Diallo
(74) *Attorney, Agent, or Firm* — Cooper Legal Group, LLC; Ronald M. Kachmarik (57) ABSTRACT

A method for locating at least one receiver in a positioning system. The system includes: at least two generators, each generator emitting, on a single carrier, at least two signals that each have a different code, and a receiver configured to detect the signals emitted by the generators. In the method: the receiver measures, for each generator, the phase difference between both signals emitted by the generator, and at least one geometric size, representing the position of the receiver in relation to the generators, is calculated on the basis of the measurements of the phase difference in order to locate the receiver in the positioning system.

14 Claims, 4 Drawing Sheets

(56) References Cited

U.S. PATENT DOCUMENTS

2002/0145563 A1    10/2002   Kane et al.
2014/0087757 A1*    3/2014   Reimann ................. H04W 4/90
                                                        455/456.1

* cited by examiner

□ Actual position   ◇ Calculated points
△ Moving average point (10)   ◆ Overall average point

METHOD FOR LOCATING A RECEIVER WITHIN A POSITIONING SYSTEM

The subject of the present invention is a method for locating at least one receiver within a positioning system, and such a positioning system.

The invention applies more particularly to systems using code division multiple access (CDMA), this being the case for example for (IPS (global positioning system) and for GNSS (global navigation satellite system). These systems implement emitters that emit a signal comprising a code-modulated carrier.

The vast majority of known positioning systems are based on a triangulation or multilateration approach in order to define, in a global or local reference frame, the coordinates of a mobile terminal, termed receiver.

Other approaches, for their part, are based on a set of polar coordinate measurements in order to obtain the coordinates of the target terminal.

These approaches are implemented at the terminal or at a more general level, such as a remote server with which the terminal communicates, or both on the terminal and on the server. The measurements give distances or angles.

Known positioning systems are effective in an outdoor environment, in the open air, but their performance deteriorates in an indoor environment or when the sky is blocked by buildings or tall obstacles. In addition, the level of precision required indoors is greater than that required outdoors, as the environment indoors is smaller and contains a greater density of information.

Furthermore, it is important to ensure continuity in positioning between outdoor and indoor environments.

Networks of sensors offer excellent performance, but their infrastructure presents a very large constraint. The sensors that are used are ultrasound, infrared or pressure sensors, or even electronic tags. The latter, in particular of near-field communication (NEC) type, are being used increasingly, but do not enable continuous positioning, either in time or in space.

Techniques using mobile telecommunications networks, such as GSM, UMTS or fourth generation (4G) networks, or local networks, such as Bluetooth, Bluetooth Low Energy (BLE), or Ultra-Wide Band (UWB) networks, require an infrastructure that may be deployed for other purposes, for needs other than location. However, it is also necessary to implement means that are specific to location. One approach, based on the identification of the cell in the case of mobile networks and called Cell-ID, has been developed for local beacons, avoiding recourse to the various calibration phases that are often required. This technique is imprecise.

What are termed "symbolic positioning" approaches have been developed, such as described in the article by Magda Chelly and Ilei Samama, *"WiFi indoor Symbolic Positioning System Implemented On a PDA"*, GNSS 2007, that are based on a hybrid solution that uses the identification of the cell in the mobile networks and the GLASS signals, and that proposes continuous positioning, which is to date imprecise and unreliable.

Inertial systems are also used, these implementing a smaller infrastructure but a complex mobile terminal and a non-trivial model. These sensors are integrated into some modern smartphones.

Approaches that use sensors amend the natural use of the latter in order to perform a locating function.

Systems that use the analysis of local variations of the magnetic field enable good performance, but are not yet technologically ready to be integrated into smartphones. Similar approaches are based on the use of magnetic beacons, and are similar to fingerprinting techniques that are currently used by local telecommunications networks.

Optical systems are also known, these using cameras that are integrated into the smartphones, but these lead to a high computing complexity for the processors of said smartphones. Image recognition systems exhibit good performance, but do not provide complete continuity: there are still implementation constraints as these systems require a conscious action on the part of the user to capture the shot and require a sharp image, thereby limiting the movement of the mobile terminal during the shot.

What is termed Li-Fi (Light Fidelity) technology is also emerging. This approach may be likened to the Cell-ID technique mentioned above, but uses the brightness sensors of the smartphones, coding each light source depending on its position by way of a light modulation, the smartphone decoding this modulation in order to determine its position. The ergonomics of using such an approach is not optimal.

Radar-type systems are based on measurements of the time taken by a wave to cover an outward-return path, making it possible to obtain a distance, and on measurements of the direction of arrival in spherical coordinates. These systems represent quite a large simplification of the customary constraints of a positioning system, namely the synchronization between the parties involved and the necessary spatial diversity. A single emitter suffices to determine a position. However, dedicated mobile terminals are necessary. Some approaches use dual antennae spaced apart by a wavelength of the signal, and measure the phase difference of the signals received by the two antennae to define the angle of arrival of the emitted signal.

Solutions using GNSS signals have been developed, in particular A-GPS (Assisted GPS) and HSGNSS (High Sensitivity GNSS), that offer an improvement to positioning performances in environments not previously covered by satellites, and that are able to be implemented without a dedicated infrastructure. However, these solutions are limited in terms of detection, precision and the time necessary to obtain a position.

It is known from U.S. Pat. No. 5,899,957 to correct carrier phase GPS signals at an arbitrary position by using phase measurements received from various UPS base stations whose position is known, in order to improve the effectiveness of the positioning.

U.S. Pat. No. 4,646,096 describes a method using the principle of movement of the constellation of satellites around a receiver by measuring and storing the phase variations of the carriers that correspond to the signals originating from said satellites, in order to determine the overall ambiguity of the measurements of the code of the corresponding signals for single-channel receivers.

It is known, in particular from U.S. Pat. No. 7,212,155, to use measurements of the variation of the carrier phase of signals originating from satellites, without using a base station, to progressively correct a hypothetical starting position of a moving receiver.

U.S. Pat. Nos. 7,671,794 and 6,549,165 disclose positioning systems that use phase difference measurements performed either on two separate antennae on reception or between two signals emitted at different frequencies.

Application WO 2014/060777 describes the positioning of a mobile terminal, using a signal sent by said terminal and received by multiple antennae of multiple wireless access points, and based on calculations of phase difference between the various antennae so as to obtain an angle of arrival of the signal at the antennae.

The majority of the methods described above have to combine or merge several techniques and/or technologies in order to achieve continuity in positioning between outdoor and indoor environments.

Known approaches based on repealites exploit the receivers and the transmitted. GNSS signals so as to enable a single GNSS receiver that is present in the mobile terminal to provide a locating function.

These approaches use the concept of pseudo-satellites, or pseudolites, that is to say a network of terrestrial emitters that transmit signals having the same structure as signals sent by a satellite, such as described in the article by Kee C. et al. "*Centimeter-Accuracy Indoor Navigation Using GPS-Like Pseudolites*", GPS World 2001, pages 14-20. The most precise measurements of the GNSS signals, which enable in particular centimeter-level positioning in good outdoor reception conditions, are used in these approaches, which offer high-quality experimental performances and are reliable and easy to use. Said approaches will make it possible, in the short term, to reduce the number of emitters required and to simplify the management of the system, in particular by eliminating the synchronization or by using low-cost emitters. Signals generated in the framework of the European satellite positioning system project Galileo enable a significant reduction of interference levels, suggesting that it will be possible to keep the bands used by GNSS signals to ensure complete continuity of the locating function.

Geopositioning using pseudolites calculates geometric intersections of spheres centered at known points, the positions of the pseudolites, by using the propagation time of the signals to measure the radii of the spheres, such as described in chapter 2 of the book by Kaplan E. and Hegarty C. "*Understanding GPS Principles and Applications*", Artech House, 2006, $2^{nd}$ edition. The propagation time of a signal is able to be measured by virtue of the code or of the carrier of the signal. However, the multipath phenomenon strongly affects the measurement time outdoors, and even more so indoors, due to the presence of numerous obstacles, such as described in chapter 6 of the abovementioned book and in the article by Fluerasu A. et al. "*Multipath modelisation of typical indoor environments optimisation of GNSS based indoor positioning*", ENC-GNSS 2008. It has been demonstrated that it is difficult to obtain precise measurements within more than 2 or 3 meters by using only code measurements, in the articles by Jardak N. and Samama N. "*Short Multipath Insensitive Code Loop Discriminator*", IEEE Transactions on Aerospace and Electronic Systems 2010, vol 46, pages 278-295, by Vervisch-Picois A. et al. "*2D Indoor Dynamic Positioning Using GNSS Based Repeaters*", ION GNSS 2006, and by Jee G. I. et al. "*Indoor Positioning Using Time Synchronised Switching GPS Repeater*", ION GNSS 2005.

Measurements of the carrier phase have the advantage of being less sensitive to the multipath problem, and enable precision of a few tens of centimeters, as presented in the articles by Rizos C. et al. "*LocumNet: Intelligent Time-Synchronised Pseudolite Transceivers for cm-Level Stand-Alone Positioning*", IAIN World Congress 2003, and by I. Salmi et al. "*Experimental Positioning Results of the Repealite Based Indoor Positioning System*", IEEE international Conference on Indoor Positioning and Indoor Navigation 2012.

However, it is difficult to perform absolute positioning before knowing the ambiguity of the carrier phase originating from each pseudolite. This ambiguity N k corresponds to the result of the Euclidean division of the propagation distance by the wavelength of the carrier: $D_{Plk} = \phi_k + \lambda \cdot N_k$, where $D_{PLK}$ is the distance between the receiver and the pseudolite k, $\phi_k$ is the value of the carrier phase, and $\lambda$ is the wavelength, for example equal to 0.19 m for the GPS signal L1.

To solve this problem indoors, methods using principles linked to the outdoor environment are known and described in the articles by Kee C. et al. "*Development of indoor Navigation System using asynchronous pseudolites*", ION GPS 2000, by Xiaoguang Wan et al. "*The Pseudolite-based Indoor Navigation System Using Ambiguity Resolution On The Fly*", IEEE $3^{rd}$ International Symposium on Systems and Control in Aeronautic and Astronautics 2010, pages 212-217, and by Puengnim A. et al. "*Precise Positioning for Virtually Synchronized Pseudolite System*", IEEE international Conference on Indoor Positioning and Indoor Navigation 2013, pages 1-8. However, as the assumption of linearity of the outdoor environment does not apply indoors, the method described by Kee et al. is based on a non-linear version of the positioning algorithm described in chapter 2 of the abovementioned book, leading to a convergence of the algorithm not being guaranteed in some situations. The methods described in the articles by Xiaoguang Wan et al. and Puengnim A. et al. are based on the use of extended Kalman filters, the first implementing measurements of the code of the signals and the least square ambiguity adjustment (LAMBDA) approach with a static initial position, and the second using the movement of the receiver to linearize the problem.

The approaches described in the articles by Petrovski I. et al. "*Precise Navigation Indoor*", IEEE SICE Annual Conference 2004, vol 2, pages 1739-4744, and by Kao Wei-Wen and Tsai Chin-Lang, "*Carrier Phase Indoor Positioning using Pseudolites And INS*" ION GNSS 2003 are based on the same principle but while using the movement, of the base station in the first case, or of the receiver, with the aid of an inertial sensor in the second case.

Other approaches using only Doppler measurements are known and described in particular in the article by Schelkshorn S. and Detlefsen J. "*Indoor Navigation Based On Doppler Measurements*", IEEE Workshop on Positioning, Navigation and Communication 2007, pages 3740. This article presents an approach that simultaneously performs Doppler measurements on a moving object to be located using four sensors that are situated at various positions. The article by Sakamoto Y. et al. "*Doppler Positioning with a Movable Receiver Antenna and a Single Pseudolite for Indoor Localization*", IEEE/AME International Conference on Advanced intelligent Mechatronics 2011, pages 19-24 presents a Doppler positioning method that is applied only to a robot having a rotary antenna.

There is a need to obtain precise location within a positioning system, that enables continuity between indoor and outdoor environments, and that implements an infrastructure that is uncomplicated and compatible with all modern mobile terminals. The aim of the invention is to respond to this need, and the invention achieves this, according to one of its aspects, by virtue of a method for locating at least one receiver within a positioning system, the system comprising:

at least two generators, each generator emitting, on one and the same carrier, at least two signals each having a different code, and     a receiver configured to detect the signals emitted by the generators, in which method:

the receiver measures, for each of the generators, the phase difference between the two signals emitted by the generator, and depending on these phase difference measurements, at least one geometric quantity is calculated that is representative of the position of the receiver with respect to the generators in order to locate the receiver within the positioning system.

The two signals emitted by each generator are preferably emitted from two emission areas of the generator that are separated from one another by a predefined distance $d_{12}$.

The two signals emitted by each generator are advantageously emitted at the same frequency.

The method according to the invention dispenses, during the measurements, with the need to know the absolute value of the distance separating the generator from the receiver. The invention produces instantaneous and unambiguous measurements that make it possible to obtain absolute positioning.

The measurements of the geometric quantities representative of the position of the receiver with respect to the generators are able to be carried out with high precision, for example of decimeter level or centimeter level, through measurements of the phase difference of radio signals, in particular of GNSS type. The locating method according to the invention has less sensitivity to disturbances caused by the propagation of the signals.

The measurements are performed for a single position of the receiver, which receiver thus does not need to be mobile in the environment.

Depending on the sign of the measured phase differences, potential symmetries are eliminated and a single point is obtained.

The invention requires only a small infrastructure, in particular a small number of generators that are independent of one another and do not need to be synchronized with one another. The use of dual-code generators makes it possible to use a receiver having only one antenna, corresponding to an 'inverted radar'.

The invention enables positioning continuity between outdoor and indoor environments.

Once the initial position of the receiver has been determined, positioning is able to be carried out in accordance with known methods.

The invention is able to be implemented with all receivers of modern mobile terminals, in particular of mobile telephones.

The method is able to be implemented indoors, being used for example for the positioning of objects in areas that are not covered by OPS or GNSS, for example buildings.

The method according to the invention is advantageously based on the generation of signals of GNSS type that are transmitted by radio, for example on RNSS (radio navigation satellite services) frequencies, and able to be processed by GNSS receivers, at least with regard to the digital processing thereof.

The frequency of the signals emitted by the generators may be arbitrary, but is preferably equal to 1.575 GHz, the signals being of Galileo GNSS type, for example.

The term 'emitter' may be substituted for the term 'generator', and vice versa.

Angle of Arrival of the Signals at the Receiver.

In a first embodiment of the invention, the geometric quantity representative of the position of the receiver with respect to a generator is the angle of arrival a of the signals emitted by the generator j at the receiver, dependent on the predefined distance $\delta\phi^j$ between the two emission areas of the generator and on phase difference $\delta\varphi^j$ measurements, and defined by:

$$\alpha_j = \text{Arccos}\left(\frac{\delta\varphi^j}{d_{12}^j}\right).$$

The angle is advantageously taken from the plane defined by the two emission areas of the generator and the receiver. It is considered that the angle in the middle of the two emission areas is identical to the angles produced directly between each area and the receiver, this being the case when the receiver is infinitely remote from said emission areas. It is advantageous for the distance between the emission areas and the receiver to be greater than at least ten times the predefined distance between the areas, for example greater than 2 meters.

At least one second angle calculation is advantageously performed with at least one second generator, in order to create a geometric intersection.

The use of the angle as a geometric quantity makes the method simple, and even works at a considerable distance, assuming that the emission lines of the signals are parallel.

Distance Between a Generator and the Receiver

In one variant or in combination, the geometric quantity representative of the position $(x_r, y_r)$ of the receiver with respect to a generator is the distance separating them, dependent on the distances $d_1$, $d_2$ between the position $(x_{a1}, y_{a1}, x_{a2}, y_{a2})$ of each emission area of the generator and the position of the receiver, which positions are defined for example by: $d_2 - d_1 = \sqrt{(x_{a2}-x_r)^2+(y_{a2}-y_r)^2} - \sqrt{(x_{a1}-x_r)^2+(y_{a1}-y_r)^2} = \delta\varphi$ for a two-dimensional (2D) positioning.

After expansion, it is possible to obtain:

$$4\delta\varphi^2 d_1^2 = (d_2^2-d_1^2)^2 + \delta\varphi^4 - 2\delta\varphi^2(d_2^2-d_1^2),$$

where:

$$d_2^2 - d_1^2 = (x_{a2}-x_r)^2 + (y_{a2}-y_r)^2 - \lfloor (x_{a1}-x_r)^2 + (y_{a1}-y_r)^2 \rfloor =$$
$$(x_{a2}^2 - x_{a1}^2) + 2(x_{a1}-x_{a2})x_r + (y_{a2}^2 - y_{a1}^2) + 2(y_{a1}-y_{a2})y_r.$$

And it is then possible to obtain the following expressions:

$$d_2^2 d_1^2 = 2\Delta X_{12} x_r + 2\Delta Y_{12} y_r + \Delta^2 X_{21} + \Delta^2 Y_{21}$$

$$(d_2^2-d_1^2)^2 = 4\Delta X_{12}^2 x_r^2 + 4\Delta Y_{12}^2 y_r^2 + (\Delta^2 X_{21}+\Delta^2 Y_{21})^2 + 8\Delta X_{12}\Delta Y_{12} x_r y_r + 4\Delta X_{12}(\Delta^2 X_{21}+\Delta^2 Y_{21}(\Delta^2 X_{21}+\Delta^2 Y_{21})y_r,$$

in which:

$$\Delta X_{12} = z_{a1}-x_{a2} \text{ and } \Delta Y_{12} = y_{a1}-y_{a2},$$

$$\Delta_2 X_{21} = x_{a2}^2 - x_{a1}^2 \text{ and } \Delta^2 Y_{21} = y_{a2}^2 - y_{a1}^2.$$

The following general relationship is obtained, dependent on the distances between the position of each emission area of the generator and the position of the receiver:

$$x_r^2 \lfloor \delta\varphi^2 - \Delta X_{12}^2 \rfloor + x_r[\delta\varphi^2 \Delta X_{12} - 2\delta\varphi^2 x_{a1} - \Delta X_{12}(\Delta^2 X_{21}+\Delta^2 Y_{21})] +$$

-continued
$$y_r^2[\delta\varphi^2 - \Delta Y_{12}^2] + y_r[\delta\varphi^2\Delta Y_{12} - 2\delta\varphi^2 y_{a1} - \Delta Y_{12}(\Delta^2 X_{21} + \Delta^2 Y_{21})] -$$
$$2\Delta X_{12}\Delta Y_{12} x_r y_r + \delta\varphi^2(x_{a1}^2 + y_{a1}^2) +$$
$$\frac{\delta\varphi^2}{2}(\Delta^2 X_{21} + \Delta^2 Y_{21}) - \frac{1}{4}(\Delta^2 X_{21} + \Delta^2 Y_{21})^2 - \frac{\delta\varphi^4}{4} = 0,$$

from which it is possible to overall form as follows:

$$A(x_r - x_{ref})^2 + Cx_r y_r + D = 0,$$

where A, B, C and D, on the one hand, and $x_{ref}$ and $y_{ref}$, on the other hand, are coefficients that are determined by the geometry of the problem and the phase difference $\delta\varphi$ measurement.

This amounts to determining a hyperbola for two-dimensional positioning, or a three-dimensional (3D) hyperboloid on which the receiver is situated, the emission areas of the generators being the foci thereof.

At least one second generator is advantageously used to obtain a system of equations and an intersection of the hyperbolas, so as to obtain the position ($x_r$, $y_r$) of the receiver.

The use of the distance separating the receiver from a generator as a geometric quantity and the expression in the form of hyperbolas does not require any approximation.

Generators

Another subject of the invention, according to another of its aspects, is a generator intended to be used within a positioning system, said system comprising at least one other generator and a receiver configured to detect the signals emitted by said generator and the other generator, said generator being configured to emit, on one and the same carrier, at least two signals each having a different code, the receiver being configured to measure the phase difference between said two signals emitted by the generator.

At least two generators are required for two-dimensional positioning and three generators for three-dimensional positioning in order to create the geometric intersections and obtain a single point.

The position of the generators within the positioning system is assumed to be known. The generators are preferably static.

The two signals emitted by each generator may originate from at least two antennae belonging to the generator and separated from one another by a predefined distance.

The predefined distance by which the two antennae of one and the same generator are separated from one another is advantageously equal to the carrier wavelength of the signals emitted by the antennae. This makes it possible to obtain unambiguous measurements at the receiver.

The signals emitted by one and the same generator are preferably synchronized with one another, for example internally by the generator.

Each generator advantageously emits on a different frequency. This makes it possible to eliminate the problem of the phenomenon of glare or of intrinsic interference between two signals emitting on one and the same frequency.

Receiver

Another subject of the invention, according to another of its aspects, is a receiver intended to be used within a positioning system comprising at least two generators, each generator emitting, on one and the same carrier, at least two signals each having a different code, the receiver detecting the signals emitted by the generators, the receiver being configured:

to measure, for each of the generators, the phase difference between the two signals emitted by the generator, and such that, depending on these phase difference measurements, at least one geometric quantity representative of the position of the receiver with respect to the generators is calculated in order to locate the receiver within the positioning system.

The receiver advantageously has a phase-locked loop that is configured to measure the phases of the signals emitted by the generators.

The receiver is advantageously multi-channel, at least one first channel being configured to detect the first signal from a generator, and at least one second channel being configured to detect the second signal from the same generator.

The receiver may be static or mobile.

It is possible to use a standard receiver, GNSS for example, as receiver, a receiver of this kind not being needed to be modified in any way to implement the method according to the invention.

Positioning System

Another subject of the invention, according to another of its aspects, is a positioning system, including:

at least two generators, each generator emitting, on one and the same carrier, at least two signals each having a different code, and a receiver detecting the signals emitted by the generators, the system being configured such that:

the receiver measures, for each of the generators, the phase difference between the two signals emitted by the generator, and depending on these phase difference measurements, at least one geometric quantity representative of the position of the receiver with respect to the generators is calculated in order to locate the receiver within the positioning system.

Variations in the Distance Between Receiver and Emitters

As a variant or in combination, another subject of the invention is a method for locating at least one receiver within a positioning system, the system comprising:

at least two emitters, each emitter emitting a signal comprising a code-modulated carrier, and a receiver that is mobile within the system and configured to detect the signals emitted by the emitters, in which method:

during the movement of the receiver, on the basis of a predefined estimated initial position of the latter, successive measurements of the carrier phase of the signal emitted by each emitter are performed for various positions of the receiver, the variations of the carrier phase of the signals between each subsequent position of the receiver, for which position the phase has been measured, and the estimated initial position of the receiver are calculated for each emitter, and these phase variations are used to calculate the variation in distance between the receiver and the emitters in order to determine the actual initial position of the receiver within the positioning system.

The combination of the two methods defined above has a certain benefit. A complete positioning system implementing these two methods makes it possible, on the basis of the same phase measurements, to have at least three modes of operation: absolute positioning by taking differences, at a given instant, between the two antennae of a generator and doing this for a plurality of generators, and then relative positioning on the basis of the obtained position, with decimeter-level precision, through phase difference measurements at successive instants, and then absolute positioning in terms of movement through analysis of the evolution of the carrier phase originating from the various antennae at a plurality of successive instants.

Figure 6:
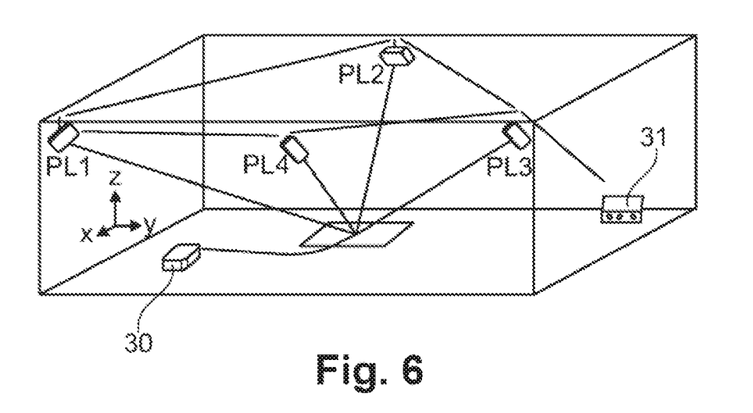

As outlined previously, and as shown in FIG. 6, a pseudolite PL1, PL2, PL3, PL4 is an emitter synchronized to a global reference time system 31 that is common to the whole constellation. It is possible to measure the pseudorange $PR_k(t)$ of a pseudolite plk at an instant t, corresponding to an indirect distance measurement, by detecting the instant of receipt of a signal originating from the pseudolite and dated on emission, when the clocks of the pseudolite and of the receiver 30 are not synchronized. This measurement may be expressed by:

$$\sqrt{(x(t)-x_{plk})^2+(y(t)-y_{plk})^2+(z(t)-z_{plk})^2}+c.b(t)=PR_k(t),$$

where (x(t), y(t), z(t)) are the coordinates of the receiver at the instant t, $(x_{plk}, y_{plk}, z_{plk})$ are the coordinates of the pseudolite plk, assumed to be known, c is the speed of light and b(t) is the clock bias between the reference time of the constellation and the clock of the receiver at the instant t. It should be noted that the height z is considered to be known in the case of two-dimensional positioning.

The pseudorange is able to be measured by using the delay of the code or the carrier phase of the incoming signal. In the case where the phase is used, the expression becomes:

$$\sqrt{(x(t)-x_{plk})^2+(y(t)-y_{plk})^2+(z(t)-z_{plk})^2}+c.b(t)=\varphi_k(t)+\lambda.N_k,$$

where $\varphi_k$ is the carrier phase dependent on the time t, $\lambda$ is the wavelength and $N_k$ is the phase ambiguity introduced previously, which is not time-dependent.

As the phase ambiguity is not time-dependent, it is advantageous, in order to eliminate it, to measure the pseudorange of an emitter according to the invention at two successive moments $t_1$ and $t_2$ and to subtract the equations obtained:

$$\sqrt{(x(t_2)-x_{plk})^2+(y(t_2)-y_{plk})^2+(z(t_2)-z_{plk})^2} - \sqrt{(x(t_1)-x_{plk})^2+(y(t_1)-y_{plk})^2+(z(t_1)-z_{plk})^2} + c\cdot(b(t_2)-b(t_1)) = \phi_k(t_2)-\phi_k(t_1)$$

For the sake of simplicity, two-dimensional positioning will be considered hereinafter, and the unknowns $x(t_1)$, $y(t_1)$, $x(t_2)$ and $b(t_2)-b(t_1)$ will be denoted $x_1$, $y_1$, $x_2$, $y_2$ and $\Delta b_{12}$, respectively, and the phase $\phi_k(q)$ will be denoted $\phi_k^j$.

At least one third instant $t_3$ may be considered, corresponding to a position of the receiver $x_3$, $y_3$ and to a clock bias $b(t_3)$, in order to obtain a new measurement and increase the number of equations.

The number of emitters $n_{pl}$ is advantageously dependent on the dimension m of the positioning and on the number of measurements $k_{pt}$ carried out for different positions of the receiver:

$$m\cdot\left(1+\frac{1}{k_{pt}}\right)\leq n_{pl}.$$

This relationship makes it possible to ascertain the minimum number of emitters needed in order for the method according to the invention to be implemented effectively.

The dimension m of the positioning may be equal to two or three, corresponding to two-dimensional or three-dimensional positioning, respectively.

In the case of a limited number of emitters, in particular two emitters, additional indications may make it easier to determine the initial position of the receiver, for example an observation of the area of the environment in which the receiver is moving and of its path, making it possible to discriminate certain symmetries, and/or to determine whether or not the path of the receiver cuts through the straight line passing through the two emitters.

The method according to the invention makes it possible to adjust to the required and available conditions: a higher number of emitters may be used if few phase measurements have to be carried out, for example to quickly obtain the position of the receiver, or, by contrast, a lower number of emitters may be used if a smaller infrastructure is desired, a higher number of phase measurements then being carried out. The length of the movement of the receiver between two positions also has to be determined, depending on the geometry of the region covered by the positioning system.

The system of equations that are obtained depending on the number of measurements performed may be linearized and solved iteratively by Newton's method or by the least squares algorithm.

It is possible to calculate the variation of the carrier phase between a subsequent position $(x_j, y_j, z_j)$ and the predefined estimated initial position $(x_1, y_1, z_1)$ of the receiver, corresponding to the instant $t_1$ and to the subsequent instant $t_j$, using the relationship:

$$\sqrt{(x_j-x_{plk})^2+(y_j-y_{plk})^2+(z-z_{plk})^2} - \sqrt{(x_1-x_{plk})^2+(y_1-y_{plk})^2+(z-z_{plk})^2} + c\cdot\Delta b_{1j} = \phi_k^j - \phi_k^1.$$

It is possible to use a first-order Taylor series to calculate the variation of the carrier phase:

$$-a_{x_k}^1 dx_1 - a_{y_k}^1 dy_1 + a_{x_k}^j dx_j + a_{y_k}^j dy_j + c\cdot d\Delta b_{1j} = \phi_k^j - \phi_k^1 - (\hat{\rho}_k^j - \hat{\rho}_k^1),$$

where $$\hat{\rho}_k^u = \sqrt{(x_u-x_{plk})^2+(y_u-y_{plk})^2+(z-z_{plk})^2} + c\cdot b(t_u),$$

$$a_{x_k}^u = -\frac{(x_{plk}-\hat{x}_u)}{\sqrt{(\hat{x}_u-x_{plk})^2+(\hat{y}_u-y_{plk})^2+(z-z_{plk})^2}}, \text{ and}$$

$$a_{y_k}^u = -\frac{(y_{plk}-\hat{y}_u)}{\sqrt{(\hat{x}_u-x_{plk})^2+(\hat{y}_u-y_{plk})^2+(z-z_{plk})^2}}.$$

The values $dx_1$, $dy_1$, $dx_j$, $dy_j$ and $d\Delta b_{1j}$, corresponding to the variation in distance between the estimated initial position and the actual initial position of the receiver, are advantageously determined at each iteration of the algorithm.

A matrix product is advantageously used to calculate the variation in distance $\Delta X$ between the receiver and the emitters:

$$H\cdot\Delta X = d\Delta\phi,$$

-continued $$\text{where } H = \begin{bmatrix} -A_1 & A_2 & 0 & 0 & \ldots & \ldots & 0 \\ -A_1 & 0 & A_3 & 0 & \ddots & \ldots & \vdots \\ \vdots & \vdots & \ddots & \ddots & \ddots & \ddots & 0 \\ -A_1 & 0 & \ldots & 0 & A_i & 0 & \vdots \\ \vdots & \vdots & \ddots & \ddots & \ddots & \ddots & 0 \\ -A_1 & 0 & \ldots & 0 & \ldots & 0 & A_{k_{pt}} \end{bmatrix},$$

$$A_1 = \begin{bmatrix} a_{x_1}^1 & a_{y_1}^1 \\ \vdots & \vdots \\ a_{x_{n_{pl}}}^1 & a_{y_{n_{pl}}}^1 \end{bmatrix} \text{ for } j=1, A_j = \begin{bmatrix} a_{x_1}^j & a_{y_1}^j & 1 \\ \vdots & \vdots & \vdots \\ a_{x_{n_{pl}}}^j & a_{y_{n_{pl}}}^j & 1 \end{bmatrix} \text{ for } j>1, \text{ and}$$

$$\Delta X = \begin{bmatrix} dx_1 \\ dy_1 \\ dx_2 \\ dy_2 \\ c \cdot d\Delta b_{12} \\ \vdots \\ dx_i \\ dy_i \\ c \cdot d\Delta b_{1i} \\ \vdots \\ dx_{k_{pt}} \\ dy_{k_{pt}} \\ c \cdot d\Delta b_{1k_{pt}} \end{bmatrix}, d\Delta \phi = \begin{bmatrix} \phi_1^2 - \phi_1^1 - (\hat{\rho}_1^2 - \hat{\rho}_1^1) \\ \vdots \\ \phi_{n_{pl}}^2 - \phi_{n_{pl}}^1 - (\hat{\rho}_{n_{pl}}^2 - \hat{\rho}_{n_{pl}}^1) \\ \phi_1^3 - \phi_1^1 - (\hat{\rho}_1^3 - \hat{\rho}_1^1) \\ \vdots \\ \phi_{n_{pl}}^3 - \phi_{n_{pl}}^1 - (\hat{\rho}_{n_{pl}}^3 - \hat{\rho}_{n_{pl}}^1) \\ \vdots \\ \phi_1^{k_{pt}} - \phi_1^1 - (\hat{\rho}_1^{k_{pt}} - \hat{\rho}_1^1) \\ \vdots \\ \phi_{n_{pl}}^{k_{pt}} - \phi_{n_{pl}}^1 - (\hat{\rho}_{n_{pl}}^{k_{pt}} - \hat{\rho}_{n_{pl}}^1) \end{bmatrix}.$$

The matrix H may be inverted so as to obtain the distance variation matrix $\Delta X = d\Delta\phi \cdot H^{-1}$.

The method according to the invention is preferably reiterated for as long as the variation in distance between the receiver and the emitters is greater than a first predefined threshold.

The choice of the estimated initial position of the receiver is fundamental for the convergence of the algorithm. The method according to the invention advantageously includes a step in which, if the variation in distance between the receiver and the emitters is greater than a second predefined threshold, the predefined estimated initial position of the receiver is modified. The phase measurements may be reiterated on the basis of this new estimated initial position.

When the variation in distance between the receiver and the emitters is smaller than the first predefined threshold, it is checked whether the initial position of the receiver determined in this way belongs to the region covered by the positioning system and delimited by the positions of the emitters.

If the determined initial position of the receiver belongs to the region covered by the positioning system, the estimated initial position of the receiver is advantageously retained as the actual position; if not, the method according to the invention may be reiterated.

The emitters may be the same as the generators defined above.

Figure 1:
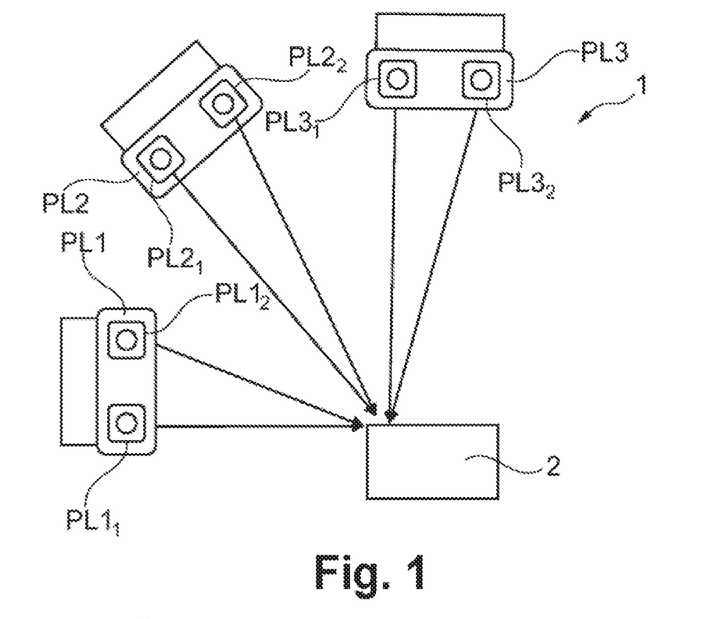
FIG. 1 schematically shows a positioning system in which a method according to the invention is able to be implemented.

The invention will be able to be better understood upon reading the following description of non-limiting exemplary implementations thereof, and upon examining the appended drawing, in which:

FIG. 1 shows an example of a positioning system 1 in which the invention is able to be implemented.

The system comprises a receiver 2 and three generators PL1, PL2, PL3 forming a local constellation. The system 1 is able to be implemented indoors, for example inside a building, or outdoors in a highly urban area, between very high walls for example. Each generator PL1, PL2, PL3 emits, in the example described, on one and the same carrier, two signals each having a different code. The emitters may be the generators described previously. These two signals are emitted from two emission areas $PL1_1$, $PL1_2$ of the generator PL1 that are separated from one another by a predefined distance $d_{12}$. In the example described, and preferably, the two signals emitted by each generator PL1, PL2, PL3 originate from two antennae belonging to the generator and that are separated from one another by a predefined distance equal to the wavelength of the carrier of the signals emitted by the antennae.

The signals emitted by one and the same generator are preferably synchronized with one another. Each generator PL1, PL2, PL3 preferably emits on a different frequency. The signals emitted by the generators PL1, PL2, PL3 are GNSS signals with a frequency equal to 1.575 GHz, for example.

The receiver 2 is configured to detect the signals emitted by the generators. Said signals are for example received by the antenna of the receiver 2 and then amplified and converted to an intermediate frequency FI that is lower than their initial frequency.

In the example under consideration, these signals are sampled and then digitized before being processed by the reception channels of the receiver 2, which is multi-channel. These reception channels may implement tracking loops. The receiver 2 advantageously has a phase-locked loop that is configured to measure the carrier phase $\varphi_k$ of the signals emitted by the generators.

The receiver 2 is advantageously configured to measure, for each of the generators PL1, PL2, PL3, the phase difference $\delta\varphi^j$ between the two signals emitted by the generator PLj.

As defined previously, depending on these phase difference $\delta\varphi^j$ measurements, the receiver 2 is advantageously configured to calculate at least one geometric quantity representative of the position of the receiver with respect to the generators PL1, PL2, PL3, in order to obtain its position $(x_r, y_r)$ within the system 1.

Figure 2:
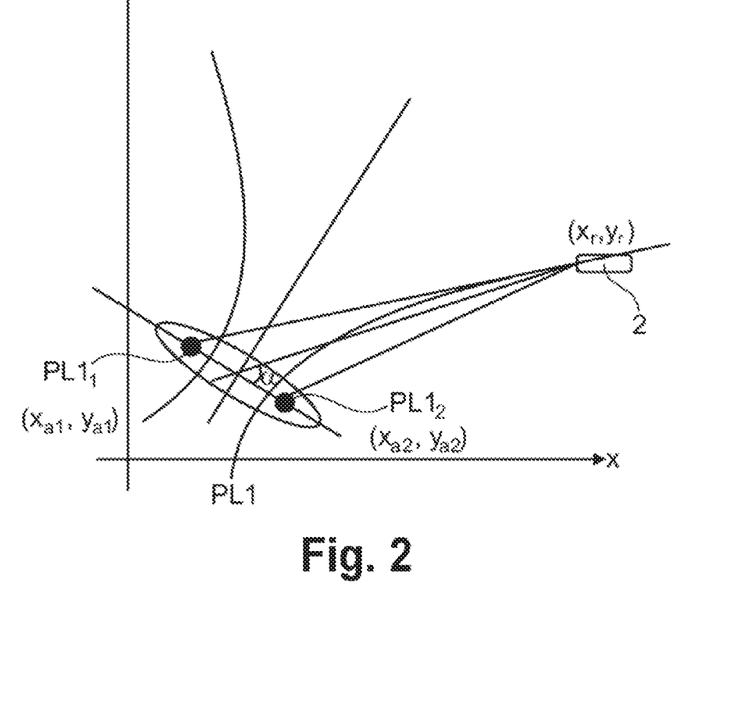
FIG. 2 shows the geometry implemented in a positioning system according to the invention.

In the example of FIG. 2, and as defined previously, the geometric quantity representative of the position $(x_r, y_r)$ of the receiver 2 with respect to a generator PLj is the angle of arrival CI, of the signals emitted by the generator PLj at the receiver, dependent on the predefined distance $d_{12}^j$ between the two emission areas of the generator and on the phase difference $\delta\varphi^j$ measurements:

$$\alpha_j = \text{Arccos}\left(\frac{\delta\varphi^j}{d_{12}^j}\right).$$

In one variant, the geometric quantity representative of the position $(x_r, y_r)$ of the receiver 2 with respect to a generator PLj is the distance separating them, dependent on the distances $(d_1, d_2)$ between the position $(x_{a1}, y_{a1}, x_{a2}, y_{a2})$ of each emission area $PLj_1$, $PLj_2$ of the generator PLj and the position $(x_r, y_r)$ of the receiver 2: $d_2-d_1=$ $\sqrt{(x_{a2}-x_r)^2+(y_{a2}-y_r)^2}-\sqrt{(x_{a1}-x_r)^2+(y_{a1}-y_r)^2}=\delta\varphi$.

Figure 3:
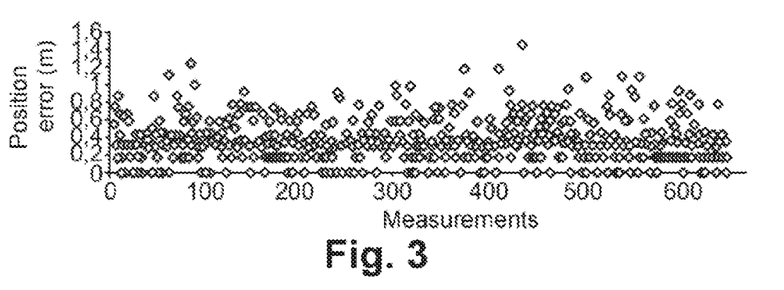
FIGS. 3 to 5 are curves showing the performance of the method according to the invention, FIG. 6 schematically shows a positioning system, according to the prior art, using pseudolites.
Figure 4:
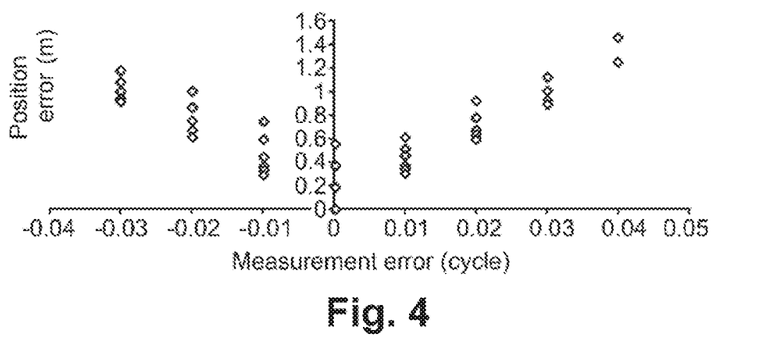
Figure 5:
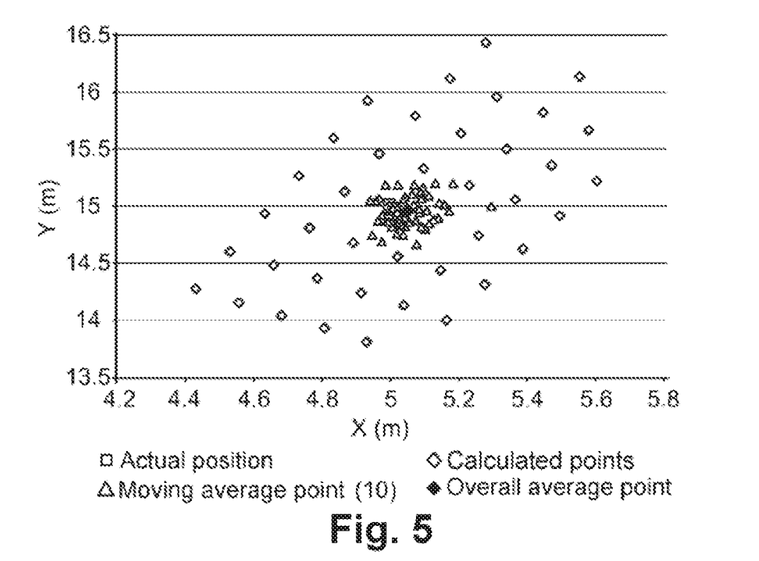

FIGS. 3 to 5 show results obtained by implementing the invention in a hail measuring 20 m by 20 m, in which the two generators PL1 and PL2 are positioned at the positions (0, 0) and (20, 0), thus being positioned on the same side of the hall.

The method according to the invention is implemented, as defined previously, in order to locate a receiver 2 located at the coordinates (5; 15) of the hall. Around 660 phase difference measurements are performed in order to evaluate the performance of the method according to the invention.

FIG. 3 shows the distribution of the position errors per measurement, corresponding to the distance between the calculated position of the receiver 2 and its actual position. According to FIG. 3, the precision of the positioning seems to be centered on around thirty centimeters.

FIG. 4 shows the distribution of the position errors as a function of the signal phase measurement errors.

FIG. 5 shows the positions of the receiver 2 that are calculated according to the invention in the plane Oxy, the sought point being shown by a square at the coordinates (5, 15) and the various calculated points being represented by light rhombi. Moving averages over 10 points have been carried out, shown by triangles, making it possible to confirm that the precision of the positioning is of the order of around thirty centimeters. The dark rhombus represents the overall average of the point obtained over the 650 measurements, which point happens to be 7.5 cm away from the actual position of the receiver 2.

Figure 7:
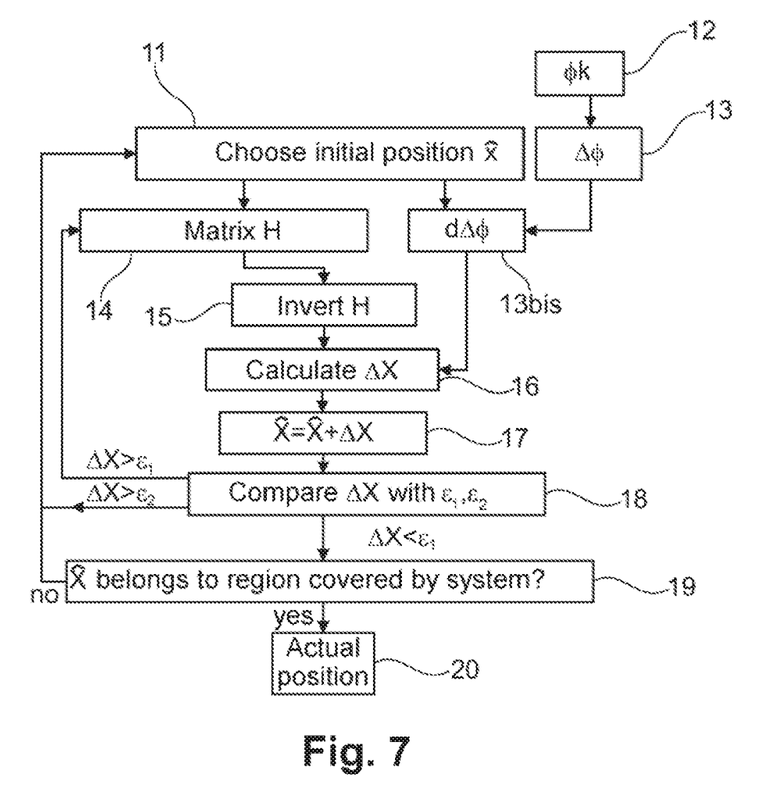
FIG. 7 illustrates steps for implementing a variant of the method according to the invention, FIG. 8 schematically shows a positioning system in which a variant of the method according to the invention is able to be implemented.
Figure 8:
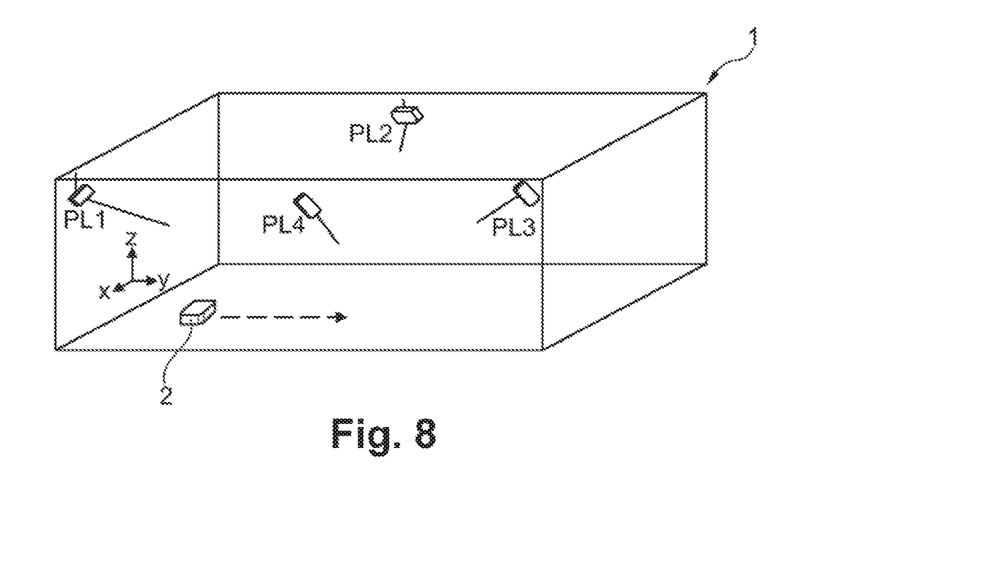

FIG. 8 shows an example of a system 1 in which the method according to a variant of the invention, steps of which are illustrated in FIG. 7, is able to be implemented.

The system 1 comprises a receiver 2 that is mobile within the system 1 and a plurality of emitters PL1, PL3, PL4 forming a local constellation. As shown in FIG. 6, the system 1 is able to be implemented indoors, for example inside a building, or outdoors in a highly urban area, between very high walls for example.

Each emitter PL1, PL2, PL3, PL4 preferably emits a signal comprising a code-modulated carrier. The emitters may be the generators described above. In this case, a single antenna per generator is advantageously considered.

As explained previously and as shown in FIG. 7, during a step 11, a predefined estimated initial position $\hat{X}$ is chosen for the receiver 2. During its movement within the positioning system 1, on the basis of this estimated initial position, during a step 12, the receiver 2 performs successive measurements of the carrier phase $\phi_k$ of the signal emitted by each emitter PL1, PL2, PL3, PL4 for various subsequent positions of the receiver $(x_j, y_j, z_j)$.

During a step 13, the variations $\Delta\phi$ of the carrier phase of the signals between each subsequent position of the receiver 2, for which position the phase $\phi_k$ has been measured, and the estimated initial position of the receiver are calculated for each emitter PL1, PL2, PL3, PL4. The matrix $d\Delta\phi$ defined previously is created during a step 13b is.

In order to calculate the variation in distance $\Delta X$ between the receiver 2 and the emitters and to determine the actual initial position of the receiver 2 within the positioning system 1, the matrix H defined previously is created during a step 14 and is inverted during a step 15. The variation in distance $\Delta X$ is calculated during a step 16.

The variation in distance $\Delta X$ thus calculated and the predefined estimated initial position $\hat{x}$ of the receiver 2 are added together during a step 17 in order to form a new initial position $\hat{x}$.

During a step 18, the variation in distance $\Delta X$ is compared with a second predefined threshold $\varepsilon_2$. If $\Delta X$ is greater than this second predefined threshold, the predefined estimated initial position $\hat{x}$ of the receiver 2 is modified, the phase and phase variation $\Delta\phi$ measurements being reiterated on the basis of this new estimated initial position.

If $\Delta X$ is smaller than this second predefined threshold $\varepsilon_2$, it is compared with a first predefined threshold $\varepsilon_1$, the method according to the invention advantageously being reiterated, starting from step 14, for as long as the variation in distance $\Delta X$ between the receiver and the emitters is greater than this first predefined threshold.

When the variation in distance $\Delta X$ between the receiver 2 and the emitters is smaller than the first predefined threshold $\varepsilon_1$, it is checked, during a step 19, whether the initial position of the receiver determined in this way belongs to the region covered by the positioning system 1 and delimited by the positions of the emitters.

If the determined initial position of the receiver belongs to the region covered by the positioning system 1, the estimated initial position $\hat{X}$ of the receiver 2 is retained as the actual position during a step 20; if not, the method is reiterated.

The first predefined threshold is between $10^{-5}$ m and $10^{-1}$ m, for example equal to $10^{-2}$ m. The second predefined threshold is between $10^2$ m and $10^5$ m, for example equal to $10^3$ m.

Figure 9:
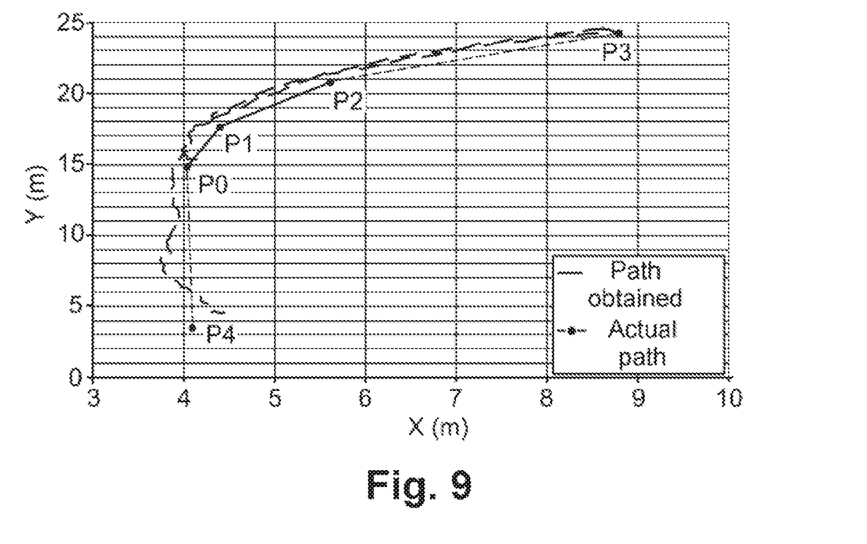
FIG. 9 illustrates a resultant receiver path obtained by implementing a variant of the method according to the invention.

FIG. 9 shows the results obtained by implementing the invention in an urban canyon in the shape of a U measuring 20 m by 30 m, formed by tall buildings. In this example, four emitters are deployed on the top floor of the buildings, at a height of around 18 m.

A receiver 2 is moving in this environment. The receiver 2 has an estimated initial position P0, and then performs an outward-return trip between the positions P0 and P3, passing via the subsequent positions P1 and P2, then goes from position P0 to position P4. The method for locating the receiver 2 according to the invention is implemented, and the positions obtained are compared with the actual path, as is visible in FIG. 9. The reconstructed path obtained is very close to the actual path, which is known beforehand for the purposes of the experiment, the gap remaining below 50 cm, as displayed in the table below showing the error and the average error for each position.

| Position | X(m) | Y(m) | Error(m) | PR(m) Average error | EHDOP |
|---|---|---|---|---|---|
| P0 | 4.04 | 14.82 | 0.44 | 0.05 | 26.7 |
| P1 | 4.39 | 17.56 | 0.43 | 0.05 | |
| P2 | 5.61 | 20.78 | 0.40 | 0.06 | |
| P3 | 8.8 | 24.15 | 0.13 | 0.28 | |

| Position | X(m) | Y(m) | Error(m) | PR(m) Average error | EHDOP |
|---|---|---|---|---|---|
| P4 | 4.09 | 3.37 | 1.08 | 0.23 | |
| P4c | 3.72 | 4.00 | 0.73 | 0.23 | 4.2 |

Positions P3 and P4 give the greatest errors because they are more difficult to estimate due to the configuration of the path, corresponding to a multipath and cycle slips building up sources of error. The method according to the invention has thus been used to correct position P4 by using an additional measurement at an intermediate position between P3 and P4, leading to the result P4c in the table above, giving a smaller error.

The last column of the table shows the results obtained for the extended horizontal dilution of precision, a value that specifies the influence of the geometry of the environment on the precision of the positioning system and that is adjusted to the method according to the invention, thus representing the influence of the measurement error on the initial position of the receiver. By considering that the errors with regard to each phase measurement are Gaussian errors centered at zero, and that these errors are distributed identically for each emitter and are independent of one another, the extended horizontal dilution of precision is able to be calculated from the formula: $\text{cov}(\varepsilon_X) = (H^T H)^{-1} \sigma_{UERE}^2$, where $\text{cov}(\varepsilon_X)$ is the error covariance matrix with regard to the estimated position of the receiver, and $\sigma_{UERE}^2$ is the error variance with regard to the measurement, or user equivalent range error. By denoting the elements $\text{cov}(\varepsilon_X)$ with $\sigma_{ij}$ and the elements $(H^T H)^{-1}$ with Dij, we obtain:

$$EHDOP = \sqrt{D_{11} + D_{22}} = \frac{\sqrt{\sigma_{11} + \sigma_{22}}}{\sigma_{UERE}}.$$

An extended horizontal dilution of precision value of between 10 and 40 is considered to be acceptable, and the results obtained for positions P0 to P4 are therefore correct. However, the extended horizontal dilution of precision value obtained for position P4c defined above is excellent. This shows that it is beneficial and necessary to use the method according to the invention over the course of the movement of the receiver within the system in order to reduce errors that build up along the path.

As explained previously, the number of emitters $n_{pl}$ of the system 1 is dependent on the dimension m of the positioning and on the number of measurements $k_{pt}$ carried out for different positions of the receiver 2:

$$m \cdot \left(1 + \frac{1}{k_{pt}}\right) \leq n_{pl}.$$

For example, for m=3, corresponding to 3D positioning, the minimum number of emitters $n_{pl}$ is equal to 5 if three different positions are used to perform three measurements $k_{pt}$: 3(1+⅓)=4. If only one measurement $k_{pt}$ is used, in order to ascertain the position of the receiver quickly, it is necessary to have: 3(1+1)=6 emitters.

The invention is not limited to the examples that have just been described.

Signals other than GPS and GNSS signals may be used, for example 4G, GSM or radio signals.

The methods according to the invention may be combined with other geopositioning methods, such as methods using a mobile reader, beacons and a geopositioning and guidance application able to be executed on said reader.

The invention may be implemented in locations where team sports are played, in particular indoors, for example by fixing or incorporating a system into football or handball courts in order to calculate the position of the players in real time, or on construction sites, for example for the installation of false ceilings, by using one or more rulers formed by a network of around ten antennae, or in large shopping malls.

The invention may be used outdoors, making it possible to dispense with base stations.

The expression 'having a' must be understood as a synonym for the expression 'comprising at least one', except when the opposite is stipulated.

The invention claimed is:

1. A method for locating at least one receiver within a positioning system, the system comprising:
    at least two generators, each generator emitting, on one and the same carrier, at least two signals each having a different code, and
    a receiver configured to detect the signals emitted by the generators,
in which method:
    the receiver measures, for each of the generators, the phase difference between the two signals emitted by the generator, and
    depending on these phase difference measurements, at least one geometric quantity is calculated that is representative of the position of the receiver with respect to the generators in order to locate the receiver within the positioning system.

2. The method as claimed in claim 1, wherein the two signals emitted by each generator are emitted from two emission areas of the generator that are separated from one another by a predefined distance.

3. The method as claimed in claim 2, wherein the geometric quantity representative of the position of the receiver with respect to a generator is the angle of arrival of the signals emitted by the generator at the receiver, dependent on the predefined distance between the two emission areas of the generator and on the phase difference measurements, and defined by:

$$\alpha_j = \text{Arccos}\left(\frac{\delta\varphi^j}{d_{12}^j}\right).$$

4. The method as claimed in claim 1, wherein the geometric quantity representative of the position of the receiver with respect to a generator is the distance separating them, dependent on the distances between the position of each emission area of the generator and the position of the receiver, which positions are defined by:

$$d_2 - d_1 = \sqrt{(x_{a2}-x_r)^2 + (y_{a2}-y_r)^2} - \sqrt{(x_{a1}-x_r)^2 + (y_{a1}-y_r)^2} = \delta\varphi.$$

5. The method as claimed in claim 1, wherein the two signals emitted by each generator originate from at least two antennae belonging to the generator and separated from one another by a predefined distance.

6. The method as claimed in claim 5, wherein the predefined distance by which the two antennae of one and the same generator are separated from one another is equal to the carrier wavelength of the signals emitted by the antennae.

7. The method as claimed in claim 1, wherein the signals emitted by one and the same generator are synchronized with one another.

8. The method as claimed in claim 1, wherein each generator emits on a different frequency.

9. The method as claimed in claim 1, wherein the frequency of the signals emitted by the generators is equal to 1.575 GHz, the signals in particular being of Galileo GNSS type.

10. The method as claimed in claim 1, being implemented indoors.

11. A positioning system, including:
   at least two generators, each generator emitting, on one and the same carrier, at least two signals each having a different code, and
   a receiver detecting the signals emitted by the generators,
the system being configured such that:
   the receiver measures, for each of the generators, the phase difference between the two signals emitted by the generator, and
   depending on these phase difference measurements, at east one geometric quantity representative of the position of the receiver with respect to the generators is calculated in order to locate the receiver within the positioning system.

12. A receiver intended to be used within a positioning system comprising at least two generators, each generator emitting, on one and the same carrier, at least two signals each having a different code, the receiver detecting the signals emitted by the generators,
   the receiver being configured:
      to measure, for each of the generators, the phase difference between the two signals emitted by the generator, and
      such that, depending on these phase difference measurements, at least one geometric quantity representative of the position of the receiver with respect to the generators is calculated in order to locate the receiver within the positioning system.

13. The receiver as claimed in claim 12, having a phase-locked loop that is configured to measure the phase of the signals emitted by the generators.

14. A generator intended to be used within a positioning system, said system comprising at least one other generator and a receiver configured to detect the signals emitted by said generator and the other generator, said generator being configured to emit, on one and the same carrier, at least two signals each having a different code, the receiver being configured to measure the phase difference between said two signals emitted by the generator.

* * * * *